(12) United States Patent
Fonseca-Dias et al.

(10) Patent No.: US 12,072,441 B2
(45) Date of Patent: Aug. 27, 2024

(54) DEVICE FOR MEASURING AT LEAST ONE PHYSICAL QUANTITY AND RELATED DETERMINATION METHOD

(71) Applicants: Commissariat à l'énergie atomique et aux énergies alternatives, Paris (FR); Centre national de la recherche scientifique, Paris (FR)

(72) Inventors: Luis-Felipe Fonseca-Dias, Grenoble (FR); Camille Jouvaud, Grenoble (FR); Christophe Delaveaud, Grenoble (FR); Hervé Aubert, Toulouse (FR)

(73) Assignees: Commissariat à l'énergie atomique et aux énergies alternatives, Paris (FR); Centre national de la recherche scientifique, Paris (FR)

(*) Notice: Subject to any disclaimer, the term of this patent is extended or adjusted under 35 U.S.C. 154(b) by 117 days.

(21) Appl. No.: 18/057,441

(22) Filed: Nov. 21, 2022

(65) Prior Publication Data

US 2023/0161001 A1 May 25, 2023

(30) Foreign Application Priority Data

Nov. 23, 2021 (FR) .................................. 21 12383

(51) Int. Cl.
G01S 7/41 (2006.01)
(52) U.S. Cl.
CPC .................................. *G01S 7/415* (2013.01)
(58) Field of Classification Search
CPC ................ G01S 7/41; G01R 29/08–10; H04B 17/10–16
See application file for complete search history.

(56) References Cited

U.S. PATENT DOCUMENTS

| | | | | |
|---|---|---|---|---|
| 8,412,112 | B2* | 4/2013 | Foegelle | H04B 17/3911 |
| | | | | 455/67.11 |
| 9,496,901 | B2* | 11/2016 | Wehrmann | H04B 1/0458 |
| 9,660,739 | B2* | 5/2017 | Reed | H04B 17/12 |

FOREIGN PATENT DOCUMENTS

| | | |
|---|---|---|
| CN | 111797963 A | 10/2020 |
| WO | WO 2010/136388 A1 | 12/2010 |

OTHER PUBLICATIONS

French Preliminary Search Report issued Jun. 10, 2022 in French Application 21 12383, filed on Nov. 23, 2021 (with English Translation of Categories of cited documents and Written Opinion), 4 pages.

(Continued)

*Primary Examiner* — Hasan Islam
(74) *Attorney, Agent, or Firm* — Oblon, McClelland, Maier & Neustadt, L.L.P.

(57) ABSTRACT

A device for measuring a physical quantity, including at least a transceiver unit for electromagnetic waves, an antenna-sensor including a sensor integrated into a target antenna having at least one excitation port, the antenna-sensor having a variable impedance with electromagnetic transduction, the measuring device being configured, per predetermined frequency band and independently of the angular difference between the transmission and reception of waves, for measuring the electromagnetic response of the antenna-sensor at least from an ellipticity rate of an electromagnetic field backscattered by the antenna-sensor, the ellipticity rate characterizing the polarization of the electromagnetic field configured to be measured by the transceiver unit, the electromagnetic response being representative, by electromagnetic transduction, of the at least one physical quantity to be measured.

13 Claims, 3 Drawing Sheets

(56) References Cited

OTHER PUBLICATIONS

Numan, A. et al. "Wide Field of View Retrodirective Millimeter Wave Antenna Array With Pulse Modulation and Orthogonal Polarization States" IEEE Access, IEEE, vol. 8. (2020) (11 pages).

Chen, Y. et al. "Circularly Polarized UHF RFID Tag Antenna for Wireless Sensing of Complex Permittivity of Liquids" IEEE Sensors Journal, vol. 21 No. 23 (2021) (9 pages).

Yang, S. et al. "Polarization-Reconfigurable Slot Loop Antenna Based on a Novel Varactor-Loaded Feeding Network" IEEE International Symposium on Radio-Frequency Integration Technology. (2016) (3 pages).

Jeanty, R. et al. "A Low-Profile Polarization-Reconfigurable Cavity Antenna Based on Partially Reflective Surface" IEEE International Symposium on Radio-Frequency Integration Technology (2017) (3 pages).

\* cited by examiner

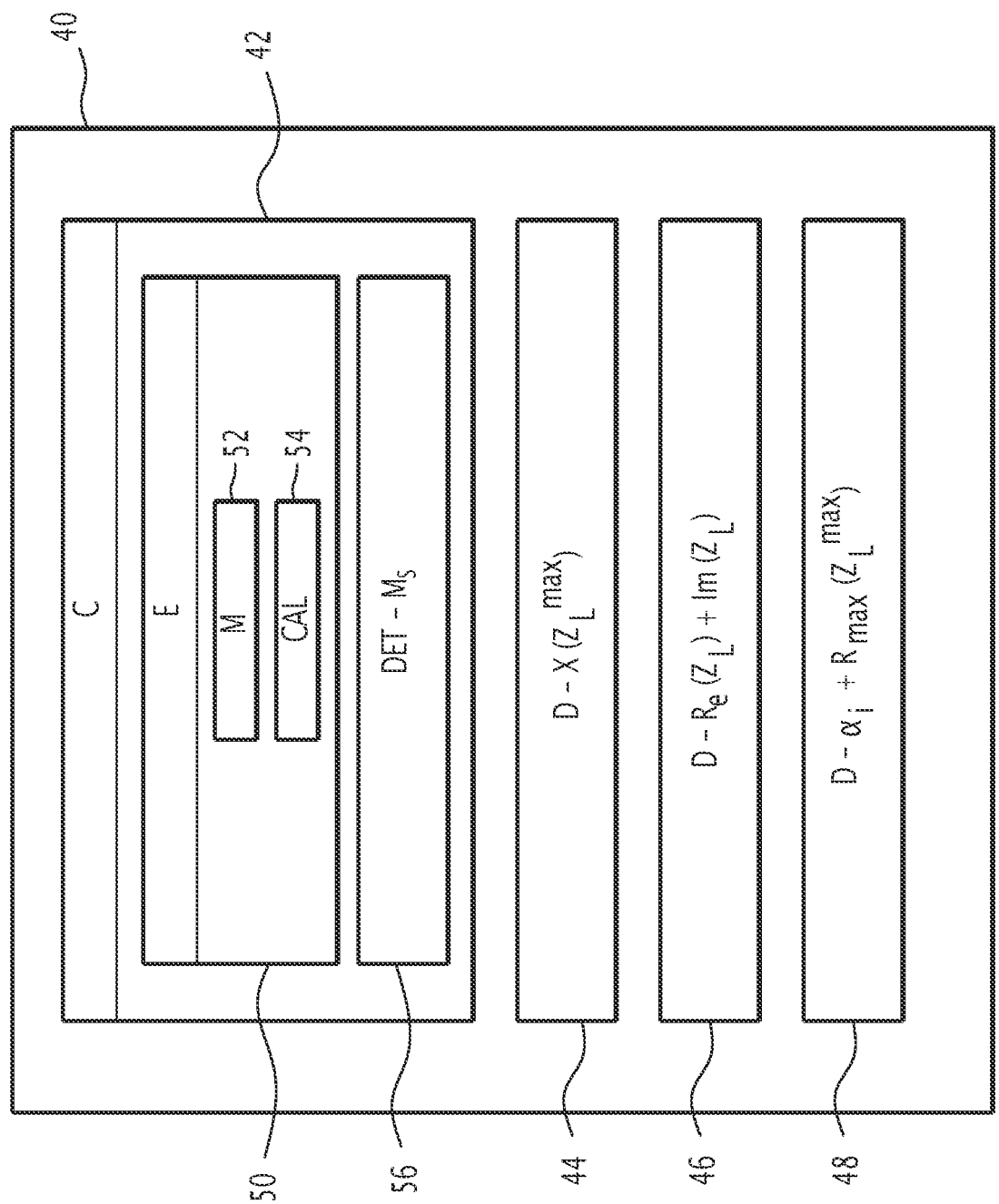

DEVICE FOR MEASURING AT LEAST ONE PHYSICAL QUANTITY AND RELATED DETERMINATION METHOD

CROSS-REFERENCE TO RELATED APPLICATIONS

This application is a U.S. non-provisional application claiming the benefit of French Application No. 21 12383, filed on Nov. 23, 2021, which is incorporated herein by reference in its entirety.

FIELD

The invention relates to a device for measuring at least one physical quantity, the measuring device comprising at least one electromagnetic wave transceiver unit, and an antenna-sensor consisting of a sensor integrated with a target antenna having at least one excitation port, the antenna-sensor having a variable impedance with electromagnetic transduction.

The invention further relates to a method for determining the range of variation of the load impedance of the sensor in the antenna-sensor of the aforementioned measuring device, and for determining the polarization of the incident field of the transceiver unit during wave transmission.

The invention belongs to the field of measuring a physical quantity, such as temperature, pressure, gas concentration, humidity, etc., by means of sensors configured to equip objects, places and physical environments, particularly in a global context of the Internet of Things (IoT).

In particular, the present invention relates to the wireless interrogation used for measuring the electromagnetic response of a sensor integrated into a target antenna, the assembly consisting of the target antenna and the sensor being referred to, hereinafter, as the antenna-sensor.

BACKGROUND

Current solutions for the design of an antenna-sensor for the measurement of physical quantities are generally based on the linear polarization measurement of the amplitude of the electromagnetic field backscattered by the target antenna, using e.g. the radar cross-section (RCS) amplitude measurement, as disclosed in particular in document WO 2010/136388 A1 at a given frequency, and/or by using the frequency variation of the maximum (i.e. peak) or of the minimum of the radar cross-section (RCS), or by measuring the amplitude of the cross-polarized component of the backscattered field, combined, where appropriate, with radar readout techniques.

However, the current solutions of the prior art for measuring a physical quantity using one or more antenna-sensor(s) do not optimally use the phase of the backscattered field and/or are generally based on constant polarization (i.e. fixed, in particular linear polarization both in transmission and in reception, or further circular polarization both in transmission and in reception) interrogation, which limits the performance of current measurements.

SUMMARY

The subject matter of the invention is to overcome the drawbacks of the prior art by proposing a device for measuring at least one physical quantity based on an antenna-sensor making possible, a better use of the field backscattered by an antenna-sensor.

To this end, the invention proposes a device for measuring at least one physical quantity, the measuring device comprising at least:
  a transceiver unit for electromagnetic waves,
  an antenna-sensor consisting of a sensor integrated into a target antenna having at least one excitation port, the antenna-sensor having a variable impedance with electromagnetic transduction,
  the measuring device being configured, per predetermined frequency band and independently of the angular difference between the transmission and reception of waves, for measuring the electromagnetic response of the antenna-sensor at least from an ellipticity rate of an electromagnetic field backscattered by said antenna-sensor, the ellipticity rate characterizing the polarization of the electromagnetic field configured to be measured by the transceiver unit, said electromagnetic response being representative, by electromagnetic transduction, of said at least one physical quantity to be measured.

Advantageously, the measuring device proposed according to the present invention can be used for quantifying, from the ellipticity rate of the electromagnetic field backscattered by said antenna-sensor, the polarization of the electromagnetic field of the antenna-sensor. The ellipticity rate can be used in particular for identifying the geometrical shape described by the electric field vector on a surface normal to the direction of propagation of the wave, and hence the polarization thereof, the range of values of the ellipticity rate varying from one to infinity on a linear scale (i.e. 0 dB to infinity), for circular and linear polarizations respectively.

According to other advantageous aspects of the invention, the measuring device comprises one or a plurality of the following features, taken individually or according to all technically possible combinations:
  the measuring device is configured to have, per predetermined frequency band, a bijective relationship between the load impedance of the sensor and the ellipticity rate of the electromagnetic field configured to be backscattered by said antenna-sensor;
  the load impedance is passive;
  said antenna-sensor is a radio-identification antenna associated with an electronic chip configured to control said load impedance, in particular for an RFID (Radio Frequency IDentification) application, said antenna-sensor being labeled "tag" or identification tag;
  said antenna-sensor is an active antenna-sensor;
  the functioning of the sensor depends on a constant local energy source, corresponding e.g. to a cell, a battery or further the mains to which the sensor is connected, and the sensor is adaptable so as to correspond in particular, to commercially known sensors, such as e.g. the LMT70 temperature sensor produced by Texas Instruments;
  the sensor is configured to integrate a tool for preprocessing and/or amplifying a signal supplied by a local energy source, such a tool corresponding e.g. to a power amplifier and/or to a circuit for conditioning said signal and/or to a microcontroller, and/or to a filter, and/or to a module configured to apply an additional transduction to the signal supplied, such a sensor enriched with a preprocessing and/or amplification tool then corresponding to an electronic system;
  said antenna-sensor is further configured to optimize the amplitude and/or phase of the backscattered electromagnetic field, by controlling the ellipticity rate of the backscattered electromagnetic field, by means of the load impedance of the sensor of the antenna-sensor;

said antenna-sensor is configured to control said ellipticity rate by means of the load impedance of the sensor, said load impedance of the sensor being configured to directly vary the antenna mode of the antenna-sensor, the value of said load impedance of the sensor being configured to be adjusted by taking into account the structure mode of the antenna-sensor, said structure mode being determined by a characterization of the associated backscattered electromagnetic field, such characterization being in particular, as described in more detail below, obtained by means of a short-circuit loading the antenna-sensor, the structure mode of the antenna-sensor being apt to be, in an extreme case, almost zero or even zero, which is then equivalent to "manipulating" only the orthogonal components of the antenna mode of the antenna-sensor and the amplitude and phase ratios thereof;

said antenna-sensor consists of a sensor integrated into a target antenna having at least two excitation ports, said antenna-sensor being configured to control said ellipticity rate by means of the load impedance of the sensor, said load impedance of the sensor being configured to directly vary the orthogonal components of the antenna mode of the antenna-sensor, the value of the load impedance of the sensor being configured to be adjusted by taking into account the structure mode of the antenna-sensor, said structure mode being determined by a characterization of the associated backscattered electromagnetic field; such characterization being in particular, as described in more detail thereafter, obtained by means of a short-circuit loading the antenna-sensor.

According to another aspect, the invention further relates to a method for determining the range of variation of the load impedance of the sensor of the antenna-sensor of the aforementioned measuring device and for determining the incidence polarization of the transceiver unit during wave transmission, the method comprising the following steps, per predetermined frequency band:

characterization of the backscattering model of said antenna-sensor for a predetermined direction of incidence and a predetermined direction of retransmission and for a predetermined plurality of polarizations of the incident plane wave transmitted by the transceiver unit, first determination of the reactance and/or resistance of the load impedance of the sensor of the antenna-sensor associated with a first value of predetermined amplitude and/or of the ellipticity rate of the backscattered field associated with said backscattering model depending on the incident plane wave polarization, second determination of the reactance and/or resistance of the load impedance of the sensor associated with a second predetermined amplitude and/or the ellipticity rate value of the backscattered field associated with said backscattering model depending on the incident plane wave polarization, third determination of the incidence polarization from the first determination and from the second determination.

According to a particular case of said method:

the characterization step is implemented for a predetermined plurality of linear polarizations of incident plane wave, as transmitted by the transceiver unit;

the first determination step corresponds to the determination of the reactance of the load impedance of the sensor of the antenna-sensor maximizing the value of the backscattered field associated with said backscattering model; and the third determination step corresponds to the determination of the incidence polarization corresponding both to a predetermined load and to the reactance of the load impedance of the sensor of the antenna-sensor maximizing the value of the backscattered field associated with said backscattering model, and obtaining the maximum resistance value of the sensor load impedance associated with a circular polarization backscattering, said range of variation of the load impedance of the antenna-sensor corresponding to a range of variation of the resistance of the load impedance of the sensor between the zero value, associated with a maximum ellipticity rate, and said maximum resistance value, associated with a zero value of the ellipticity rate, for a constant reactance value equal to the reactance of the load impedance of the sensor of the antenna-sensor maximizing the value of the backscattered field associated with said backscattering model.

According to a particular optional supplementary case of said method, said step of characterization of the backscattering model of said antenna-sensor comprises:

the local excitation of the antenna of said antenna-sensor and:

the measurement of the orthogonal components of the radiated field thereof, said measurement of the orthogonal components corresponding to the measurement of two distinct orthogonal cases of the incident wave configured to characterize the associated structure mode, in particular a measurement in vertical incidence and a measurement in horizontal incidence, which can be used for defining the entire plane of incidence, which is then supplemented by a digital post-processing in addition to the two orthogonal incidences associated with the two above-mentioned measurements, a plurality of predetermined incidence polarizations;

depending on the number of excitation port(s) of said target antenna, the calculation of at least one impedance at an interface between said antenna and a load impedance of said antenna, with a predetermined value;

the determination of the structure mode of the antenna of said antenna-sensor by loading said antenna by a short circuit and illuminating by a predetermined incident wave.

BRIEF DESCRIPTION OF THE DRAWINGS

Other features and advantages of the invention will be clear from the description thereof which is given below as a non-limiting example, with reference to the enclosed figures, among which:

FIG. 3 schematically illustrates a particular case of the method of determining the range of variation of the load impedance of the sensor of the antenna-sensor of the measuring device according to the present invention, and of the incidence polarization.

DETAILED DESCRIPTION

Figure 1:
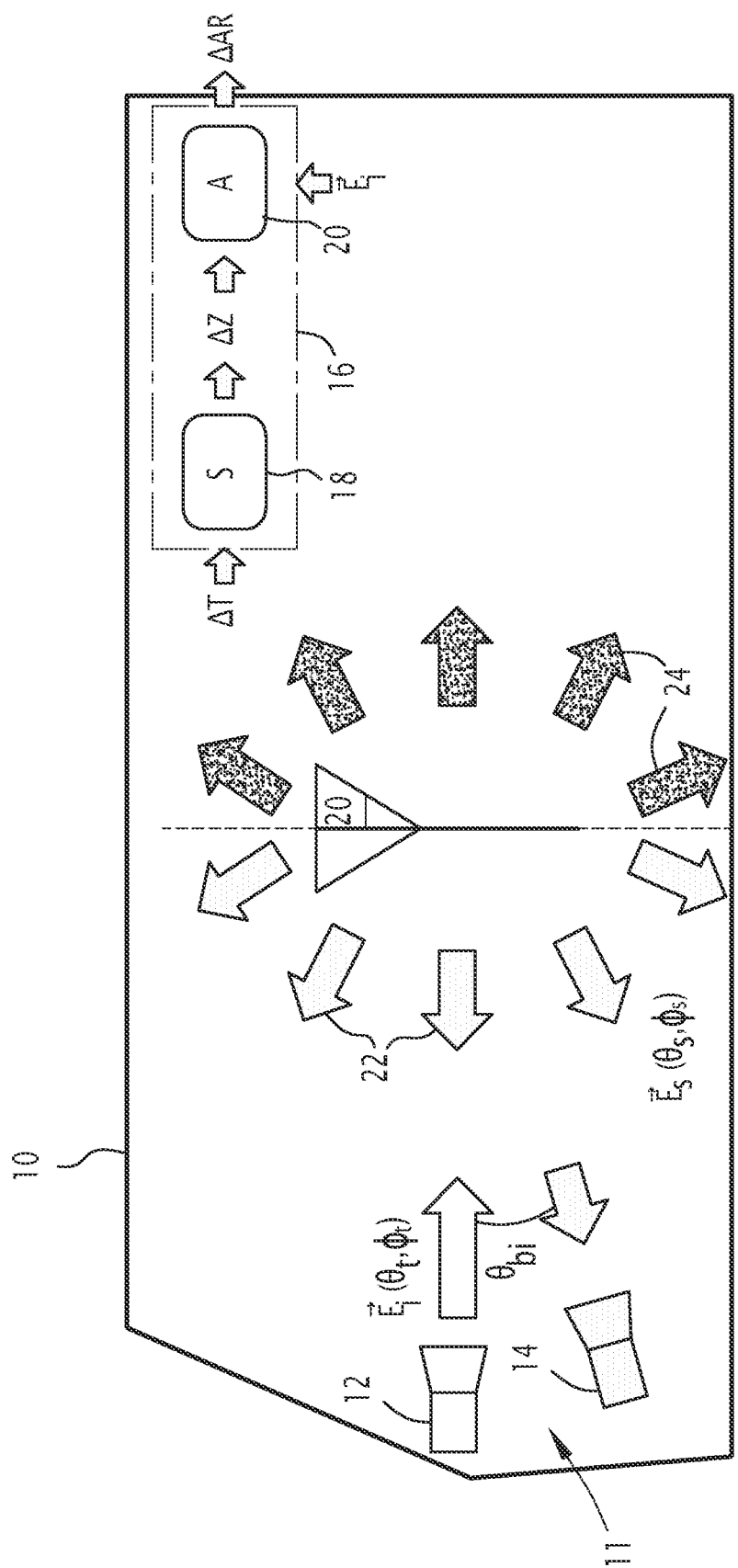
FIG. 1 schematically illustrates a device for measuring at least one physical quantity according to an embodiment of the invention.

FIG. 1 first schematically illustrates the working principle of a measuring device 10 according to the present invention.

Such a measuring device 10 corresponds to a wireless interrogation system, used for measuring a physical quantity, such as temperature, pressure, gas concentration, humidity, etc.

To do this, the measuring device 10 according to the present invention, comprises a transceiver unit 11 for electromagnetic waves, comprising e.g. a transmitting antenna 12, a receiving antenna 14. The measuring device 10 comprises an antenna-sensor 16 consisting of a sensor 18 integrated with a target antenna 20 having at least one excitation port, the antenna-sensor 16 having a variable impedance with electromagnetic transduction.

In particular, for an RFID (Radio Frequency IDentification) application, said antenna-sensor 16 is labeled as "tag" or identification tag.

The measuring device 10 is configured to measure the electromagnetic response of the sensor 18 integrated into the target antenna 20, hence the term "antenna-sensor" 16.

It should be noted that within the measuring device 10, the transmitting antenna 12, the receiving antenna 14 and the antenna-sensor 16 are placed at the same height, and the receiving antenna 14 has an angular deviation from the transmitting antenna 12 $\theta_{bi}$, also commonly referred to as a bistatic angle and apt to vary from 0 to 360°.

In the example shown in FIG. 1, the transceiver unit 11 comprises the distinct transmitting antenna 12 and receiving antenna 14, and preferentially consists of said transmitting antenna 12 and receiving antenna 14.

In a variant (not shown), the transceiver unit 11 includes a single antenna for transmitting and receiving electromagnetic waves. According to such variant, the transceiver unit 11 preferentially consists of said transceiver antenna. In other words, such variant corresponds to a monostatic case wherein the transmitting antenna 12 and the receiving antenna 14 shown in FIG. 1 are merged.

Hereinafter in the description, a person skilled in the art would then understand that the transmitting antenna 12 corresponds both to the transmitting antenna distinct from the receiving antenna in the example shown in FIG. 1, and as a variant, to the single transceiver antenna working in transmission. Similarly, a person skilled in the art would understand that the receiving antenna 14 corresponds both to the receiving antenna distinct from the transmitting antenna 45 in the example shown in FIG. 1, and as a variant, to the single transceiver antenna working in reception.

The transmitting antenna 12 is excited by an electrical source at a predetermined working frequency according to the desired application and the energy is transmitted in the form of an electromagnetic wave corresponding to the complex electromagnetic incident field $\vec{E}_i(\theta_t, \Phi_t)$ where $\theta_t$, $\Phi_t$ represent, in spherical coordinates, the direction of the incident field transmitted by the transmitting antenna 12, the transmitting antenna 12 corresponding to the center of the predetermined reference frame wherein such spherical coordinates are established.

In the far field, said antenna-sensor 16 is illuminated by the wave transmitted by the transmitting antenna 12, and in response, generates by backscattering, an electromagnetic response corresponding to the retransmitted complex electromagnetic field $\vec{E}_S(\theta_S, \Phi_S)$ wherein $\theta_s$, $\Phi_s$ represent, in spherical coordinates, any direction of the complex field transmitted by the antenna-sensor 16, the antenna-sensor 16 corresponding to the center of the predetermined reference frame wherein such spherical coordinates are established.

Such a complex electromagnetic field $\vec{E}_S(\theta_S, \Phi_S)$ comprises a backscattering illustrated by the arrows 22 toward the receiving antenna 14 and a forwards backscattering illustrated in FIG. 1 by the arrows 24.

Such an electromagnetic response of the antenna-sensor 16 is generally quantified by the radar cross-section (RCS) $\sigma$, in square meters, expressed theoretically for a given frequency as a function of the incident field $\vec{E}_i$ generated by the transmitting antenna 12 and the field $\vec{E}_S$ generated by the antenna-sensor (i.e. depending on the directions of transmission and reception) in the following form:

$$\sigma = \lim_{R \to \infty} 4\pi R^2 \left(\frac{E_s}{E_i}\right)^2 \tag{1}$$

where R is the field definition distance with respect to the source (i.e. the distance between the transmitting antenna 12 and the antenna-sensor 16).

The radar cross-section (RCS) is characterized by two modes, namely the structure mode and the antenna mode.

The structure mode depends on the geometry and on the material of the illuminated object, and, in the vast majority of backscattering situations, same corresponds to the dominant mode.

As for the antenna mode, same occurs at frequencies where the target object (i.e. the target antenna 20) resonates. Such an antenna mode is directly related to the radiation gain of the target antenna 20, and further depends on the impedance ratio between the antenna and a load in a way which is theoretically illustrated in the classical literature by the following equations:

$$\sigma = \left|\sqrt{\sigma_{struct}} - (1 - \Gamma_a)\sqrt{\sigma_{ant}} \, e^{j\phi_{rel}}\right|^2 \tag{2}$$

$$E_s = E_{short} - (1 - \Gamma_a)\frac{I_0}{2I_a} E_{ant} \tag{3}$$

$$\text{where: } \Gamma_a = \frac{Z_a - Z_L}{Z_a + Z_L} \tag{4}$$

$E_s$ is the complex field backscattered by the antenna-sensor, $\sigma_{struct}$ is the either real or complex RCS value $\sigma$ associated with the structure mode, $\Gamma_a$ is the reflection coefficient between the antenna and the load impedance, $\sigma_{ant}$ is the either real or complex RCS value $\sigma$ associated with the antenna mode, $\phi_{rel}$ the real phase shift between the antenna and structure modes, $E_{short}$ the complex field, backscattered by the target antenna 20 when the excitation port(s) thereof is (are) short-circuited, $I_0$ the complex current, at the excitation port(s) of the target antenna 20 associated with the backscattering of the field $E_{short}$, $I_a$ is the complex current, at the excitation port(s) of the target antenna 20 associated with a local source configured to generate the complex field $E_{ant}$, radiated by the antenna from the local excitation generated by said local source, and $Z_a$ is the complex impedance seen from the excitation port of the target antenna 20 when same has only one port, and $Z_L$ is the complex load impedance of the target antenna 20.

The sensor 18 of the antenna-sensor 16 is configured in particular for transforming the physical quantity of interest (i.e. the value to be measured) into another quantity compatible with the measurements, and the target antenna 20 acts as a transducer, transforming the response of the sensor, or sensitive element, into an electromagnetic backscattering response. In other words, said target antenna 20 is an electromagnetic transducer configured to generate, after an illumination by the incident field, an electromagnetic response which is representative, by electromagnetic transduction, of said at least one physical quantity to be measured by the sensor 18, the two elements, target antenna 20 and sensor 18, then forming the measuring system called the antenna-sensor 16.

As illustrated in FIG. 1, the physical quantity, e.g. a temperature or temperature variation ΔT, corresponds to an input of the sensor 18 which associates same at the output thereof, with a complex impedance ΔZ (also referred to previously and subsequently as load impedance $Z_L$) configured to subsequently modify the response of the target antenna 20 to the incident wave, by affecting the polarization of the field backscattered by the antenna-sensor 16.

In other words, the antenna-sensor has a variable impedance based on electromagnetic transduction.

Specifically according to the present invention, per predetermined frequency band and independently of the angular difference $\theta_{bi}$ between said transmitting antenna 12 and said receiving antenna 14, the measuring device 10 according to the present invention is configured to measure the electromagnetic response of the antenna-sensor 16, at least from the ellipticity rate AR or a variation in the ellipticity rate ΔAR of the electromagnetic field backscattered by said antenna-sensor 16, the ellipticity rate AR quantifying the polarization of the electromagnetic field configured to be measured by the transceiver unit 11, in particular by said receiving antenna 14, said electromagnetic response being representative, by electromagnetic transduction, of said at least one physical quantity to be measured, e.g. a temperature or temperature variation ΔT as illustrated in FIG. 1.

In other words, the invention aims to design an antenna-sensor the polarization of the backscattered field of which is controlled by the complex impedance variation of the sensor, as such representative of the physical quantity to be measured.

According to an embodiment of the present invention, in order to implement the polarization conversion performed by the antenna-sensor 16, the measuring device 10 is configured to have, per predetermined frequency band, a bijective relationship between the load impedance $Z_L$ (also called ΔZ as illustrated in FIG. 1) of the sensor 18 and the ellipticity rate AR of the electromagnetic field configured to be backscattered by said antenna-sensor 16.

Several embodiment variants of such embodiment mode are configured to be implemented according to the present invention.

According to a first variant, the load impedance $Z_L$ is passive, and the measuring device 10 is configured to have a passive load impedance range, where the ellipticity rate AR has a bijective variation which is greater than a predetermined threshold (i.e. there is only one impedance value per ellipticity rate within said range).

According to a second variant, said antenna-sensor 16 is a radio-identification antenna associated with an electronic chip configured to control said load impedance $Z_L$. In particular for an RFID application, said antenna-sensor 16 is labeled "tag", or identification tag, and the control of said load impedance $Z_L$ is aimed in particular, at responding to issues, such as range, autonomy or even a low profile of the antenna-sensor 16.

According to a third variant, said antenna-sensor 16 is an active antenna-sensor. In particular, according to an optional aspect of such third variant, the functioning of the sensor 18 depends on a constant local energy source (not shown), corresponding e.g. to a cell, a battery or the mains to which the sensor is connected, and the sensor 18 is adaptable so as to correspond in particular to commercially known sensors, such as e.g. the LMT70 temperature sensor produced by Texas Instruments.

According to another optional aspect of such third variant, the sensor 18 is configured to integrate a tool for preprocessing and/or amplifying a signal supplied by a local energy source, such a tool corresponding e.g. to a power amplifier and/or to a circuit for conditioning said signal and/or to a microcontroller, and/or to a filter, and/or to a module configured to apply an additional transduction to the signal supplied, such a sensor 18 enriched with a preprocessing and/or amplification tool then corresponding to an electronic system.

Independently of the variant implemented according to such embodiment, the embodiment makes it possible to express the field backscattered by the antenna-sensor 16 as a function of a complex impedance with which same is loaded, and the variation of the impedance directly controls the polarization conversion. The present embodiment is applicable to any type of target antenna 20 having at least one excitation port, provided that said target antenna 20 works in the antenna mode, and not such as a reflecting element (i.e. outside resonance).

Optionally, the antenna-sensor 16 is further configured to optimize the amplitude and/or phase of the backscattered electromagnetic field, by controlling the ellipticity rate of the backscattered electromagnetic field using the load impedance of the sensor of the antenna-sensor.

Such a control is implemented according to the present invention, taking into account at least one of the two modes characterizing the RCS, namely the structure mode and the antenna mode.

Such an additional and optional property of the antenna-sensor 16 is particularly configured to meet a secondary goal of the present invention, namely to maximize the amplitude of the backscattered signal at a specific ellipticity rate, particularly in linear polarization, as discussed in detail thereafter with reference to FIG. 3 which illustrates a particular case of the method for determining the range of variation of the load impedance of the sensor of the antenna-sensor of the measuring device according to the invention, and for determining the incidence polarization of the transmitting antenna.

The advantage of such maximization is to improve the range of the antenna-sensor 16 when the impact of the disturbing echoes (known as clutter) is maximum in linear polarization backscattering of the co-polar component.

According to a first optional variant of such optional complement, said antenna-sensor 16 is configured to control said ellipticity rate by means of the load impedance of the sensor 18, said load impedance $Z_L$ of the sensor 18 being configured to directly varying the antenna mode of the antenna-sensor, the value of said load impedance of the sensor being configured to be adjusted by taking into account the structure mode of the antenna-sensor, said structure mode being determined by a characterization of the associated backscattered electromagnetic field, such characterization being in particular, as described in more detail below, obtained by means of a short-circuit loading of the antenna-sensor, the structure mode of the antenna-sensor being apt to be, in an extreme case, almost zero or even zero, which is then equivalent to "manipulating" only the orthogonal components of the antenna mode of the antenna-sensor and the amplitude and phase ratios thereof.

According to a second optional variant of this optional complement, said antenna-sensor 16 consists of a sensor integrated into a target antenna having at least two excitation ports, said antenna-sensor being configured to control said ellipticity rate by means of the load impedance of the sensor, said load impedance of the sensor being configured to directly vary the orthogonal components of the antenna mode of the antenna-sensor, the value of the load impedance of the sensor being configured to be adjusted by taking into account the structure mode of the antenna-sensor, said structure mode being determined by a characterization of the associated backscattered electromagnetic field; such characterization being in particular, as described in more detail thereafter, obtained by means of a short-circuit loading the antenna-sensor.

Figure 2:
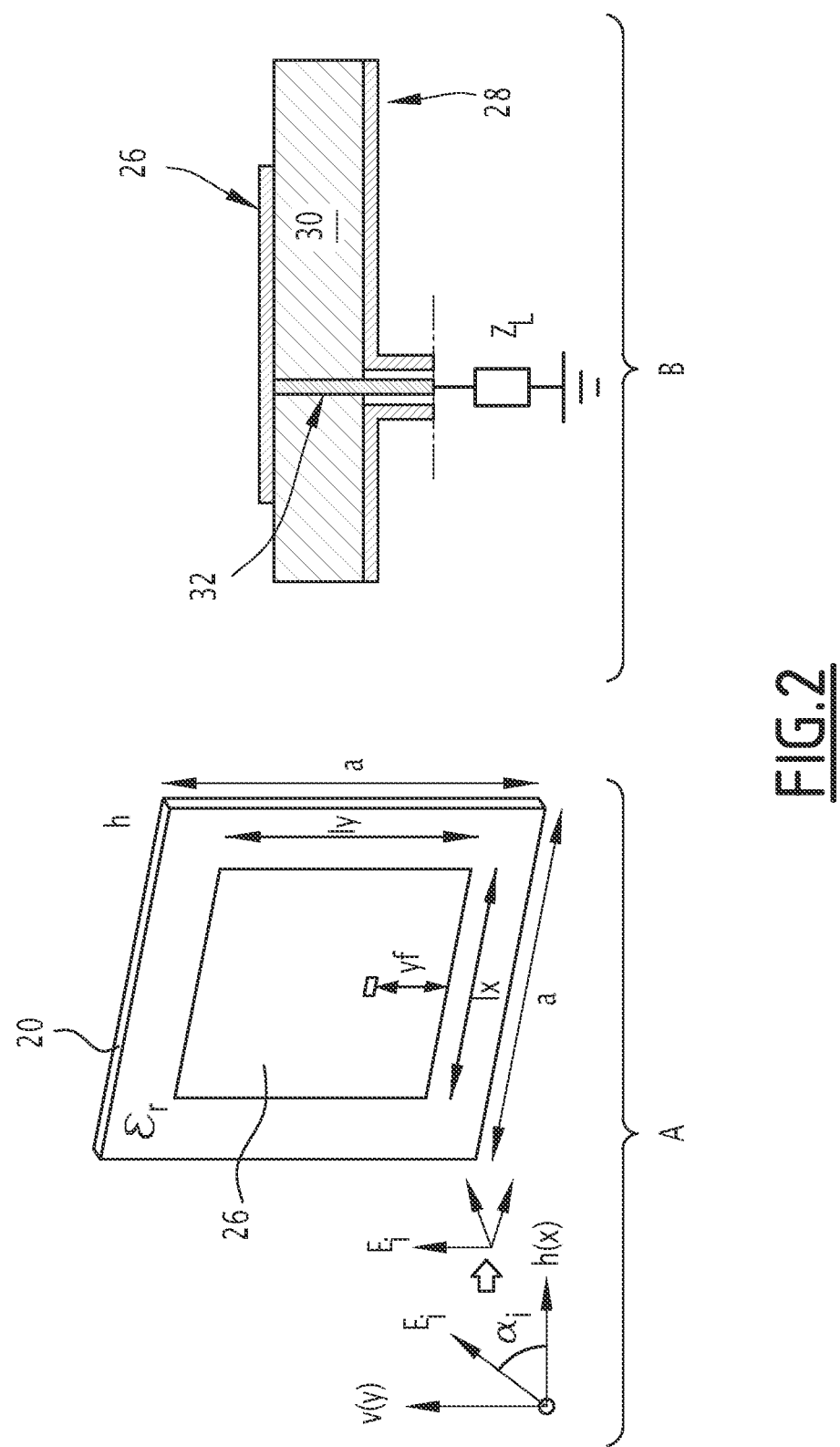
FIG. 2 shows an example of a target antenna of said measuring device.

FIG. 2 illustrates a non-limiting example of a target antenna 20 of said measuring device 10 as proposed according to the present invention.

According to such non-limiting example, the target antenna 20 shown in part A is a microstrip (patch) antenna comprising a radiating element 26 at a port resonating at the frequency of 868 MHz and having a vertical linear radiation polarization. The dimensions of the target antenna 20 are given, as an example, but not limited to, in millimeters, with the relative permittivity of the substrate shown in the table below:

TABLE 1

| a | $l_y$ | $l_x$ | yf | h | $\varepsilon_{r\_substrat}$ |
|---|---|---|---|---|---|
| 200 mm | 147 mm | 134 mm | 49.3 mm | 5 mm | 4.3 |

It should be noted that other types of antennas, on other frequency bands, are configured to be used according to the present invention, as well as an excitation at one or a plurality of excitation ports.

Part B of FIG. 2 corresponds to a sectional view (i.e. a sectional view along the thickness of the target antenna 20 shown in part A of FIG. 2).

According to the sectional view of part B, the radiating element 26 is separated from a ground plane 28 by means of a substrate 30 and loaded via a probe 32 by the load impedance $Z_L$ of the sensor 18 connected at one end to ground.

Moreover, according to such example, the measuring device 10 (i.e. the interrogation system) is configured so that the transmitting 12 and receiving 14 antennas coincide (i.e. share a common electronic system or antenna, which is equivalent to the monostatic case wherein the transmitting 12 and receiving 14 antennas shown in FIG. 1 are merged).

In such example, the measuring device is also configured so that the transmitting antenna 12 and the target antenna 20 are positioned so that the incident wave transmitted by the transmitting antenna 12 illuminates the target patch antenna 20 at an angle normal to the surface thereof.

According to the example shown in FIG. 2, the transmitting antenna 12 generates e.g. an incident wave with linear polarization rotated by an angle of inclination $\alpha_i$, the value 0° of which corresponds to the horizontal polarization h(x), and the value 90° to the vertical polarization v(x).

According to the example shown in FIG. 2, it should be noted that the cross-polarized components of the antenna-sensor 16 and in particular, same of the target antenna 20, are too weak to have an impact.

According to such example, the incident field $\vec{E}_i$ generated by the transmitting antenna 12 is configured to be expressed via the following equation, for a given direction $(\theta_t, \Phi_t)$ of the direction of the incident field:

$\vec{E}_i = |E_i|(\sin \alpha_i\, e^{j\delta_i}\, \hat{v} + \cos \alpha_i\, \hat{h})$ 5 where $\delta_i$ corresponds to the relative phase shift between the vertical component and the horizontal component.

and the complex electromagnetic field $E_{scat}$ backscattered by the antenna-sensor 16 is expressed via the following corresponding equation, for a given direction $(\theta_s, \Phi_s)$ of the direction of the incident field:

$$E_{scat}^V = \left[ E_{short}^V - (1 - \Gamma_a)\frac{I_0}{2I_a} E_{ant}^V \right] |E_i| \sin \alpha_i\, e^{j\delta_i} \quad (6)$$

$$E_{scat}^H = E_{short}^H |E_i| \cos \alpha_i$$

where the letters V and H represent the vertical and horizontal components, respectively.

As indicated above, the present invention further relates to a method 40 for determining the range of variation of the load impedance $Z_L$ of the sensor 18 of the antenna-sensor 16 of the measuring device 10 illustrated in FIG. 1, and for determining the incidence polarization of the transmitting antenna. A particular embodiment of the method according to the present invention is illustrated in FIG. 3 and described thereafter.

In particular, in general, such a method 40 comprises first of all, a step 42 of characterization C of the backscattering model of said antenna-sensor 16 for a predetermined direction of incidence $(\theta_t, \Phi_t)$) and a predetermined direction of diffusion $(\theta_s, \Phi_s)$) and for a predetermined plurality of polarizations of the incident plane wave transmitted by the transmitting antenna.

Then according to a step 44, the method 40 comprises a first determination of the reactance and/or resistance of the load impedance of the sensor of the antenna-sensor associated with a first predetermined amplitude and/or ellipticity rate value of the backscattered field associated with said backscattering model depending on the incident plane wave polarization.

Then, according to a step 46, the method 40 comprises a second determination of the reactance and/or resistance of the load impedance of the sensor associated with a second predetermined amplitude and/or ellipticity rate value of the backscattered field associated with said backscattering model depending on the incident plane wave polarization.

Finally, according to a step 48, the method 40 comprises a third determination of the incidence polarization from the first determination and from the second determination.

According to a particular variant, the step 42 of characterization C of the backscattering model of said antenna-sensor 16 comprises a sub-step 50 of local excitation E of the target antenna 20 of said antenna-sensor 16 and during the excitation E:
- a sub-step 52 of measurement M of the orthogonal components of the radiated field thereof;
- depending on the number of excitation ports of said target antenna 20, a sub-step 54 of calculation CAL of at least one impedance at an interface between said antenna and a load impedance of said antenna, with a predetermined value (which is equivalent to calculating the parameters S of the target antenna 20 and transforming the parameters into said impedance).

Moreover, according to such particular variant, the step 42 of characterization C further comprises a sub-step 56 of determination of the structure mode of the target antenna 20 of said antenna-sensor 16 by loading said target antenna 20 with a short-circuit and illuminating with a predetermined incident wave. Thus, according to such particular variant, the step 42 provides the characterization C of the backscattering model with the orthogonal components of the structure and antenna modes of the target antenna 20.

In other words, according to such particular variant, during the step 42 of characterization C, the values $E_{short}^V$ and $E_{short}^H$ associated with the structure mode of the target antenna 20 are determined by loading said target antenna 20 with a short-circuit and illuminating with a predetermined incident wave, and the values $E_{scat}^V$ and $E_{scat}^H$ associated with said illumination by a predetermined incident wave are determined as well, for a predetermined plurality of polarizations, each defined by means of a plurality of values of the parameters $\alpha_i$ of the inclination angle and $\delta_i$ of the relative phase shift between the vertical and horizontal components of the incident plane wave transmitted by the transmitting antenna 12.

In other words, from the above-mentioned equation (6) which can be generalized in the form of backscattered fields as functions of 3 parameters:

$$E_{scat}^V(\alpha_i, \delta_i, Z_L)$$

$$E_{scat}^H(\alpha_i, \delta_i, Z_L)$$

and considering that the parameters related to the incidence polarization are defined within a certain angular range, such as e.g.:

$$\begin{cases} -90° \le \alpha_i \le 90° \\ 0 \le \delta_i \le 360° \end{cases}$$

with in particular, a predetermined pitch of 90° for $\alpha_i$ and a pitch of 180° for $\delta_i$, which is equivalent to characterizing nine combinations:

$$\begin{aligned} \alpha_i &= [-90° \ 0 \ 90°] \\ \delta_i &= [0 \ 180° \ 360°] \end{aligned},$$

the backscattering model of said antenna-sensor 16 is characterized for the nine different combinations of incidence polarizations by associating with each of the nine combinations $(-90°, 0, Z_{L,1})$, $(-90°, 180°, Z_{L,2})$, $(-90°, 360°, Z_{L,3})$, ..., $(90°, 180°, Z_{L,8})$, $(90°, 360°, Z_{L,9})$ respectively, a pair of results comprising the backscattered field $E_{scat}$ and the corresponding ellipticity rate AR, namely $(E_{scat,1}; AR_1)$, $(E_{scat,2}; AR_2)$, $(E_{scat,3}; AR_3)$, ..., $(E_{scat,8}; AR_8)$, and $(E_{scat,9}; AR_9)$, respectively, with AR the ellipticity rate such that:

$$AR = \frac{\sqrt{\frac{1}{2}\left(|E_{scat}^H|^2 + |E_{scat}^V|^2 + \sqrt{|E_{scat}^H|^4 + |E_{scat}^V|^4 + 2|E_{scat}^H|^2|E_{scat}^V|^2\cos(2[\phi_v - \phi_h])}\right)}}{\sqrt{\frac{1}{2}\left(|E_{scat}^H|^2 + |E_{scat}^V|^2 - \sqrt{|E_{scat}^H|^4 + |E_{scat}^V|^4 + 2|E_{scat}^H|^2|E_{scat}^V|^2\cos(2[\phi_v - \phi_h])}\right)}}$$

where $|E_{scat}|$ represents the amplitude of the backscattered field (V or H), and represents the phase of the field (V or H).

According to such non-limiting general example, during the general step 44 of first determination, the method consists of imposing a first condition corresponding to an amplitude value of the backscattered field, e.g. ($|E_{scat}|=|E_{scat,1}|$) and/or to an ellipticity rate ($AR=AR_1$), among the different above-mentioned results correspondingly associated with the different incidence polarizations used during the preceding characterization step 42. In other words, during the first determination step 44, a search is made for each incidence polarization (−90°, 0, $Z_{L,1}$), (−90°, 180°, $Z_{L,2}$), (−90°, 360°, $Z_{L,3}$) . . . , (90°,180°, $Z_{L,8}$), (90°, 360°, $Z_{L,9}$), for a load impedance $Z_{L,n}$ for obtaining the first imposed condition (($|E_{scat,1}|$; $AR_1$). Thus, nine load impedance values ($Z_{L,1}$), ($Z_{L,2}$, $Z_{L,3}$), ($Z_{L,4}$), ($Z_{L,5}$), ($Z_{L,6}$, $Z_{L,7}$, $Z_{L,8}$), ($Z_{L,9}$) are obtained, correspondingly associated with each of the nine above-mentioned incidence polarizations and each time satisfying the first imposed condition (($|E_{scat,1}|$; $AR_1$).

According to such non-limiting general example, during the general step 46 of second determination, the method consists of imposing a second condition corresponding to another amplitude value of the backscattered field, e.g. ($|E_{scat}|=|E_{scat,2}|$) and/or to an ellipticity rate ($AR=AR_2$), among the different above-mentioned results correspondingly associated with the different incidence polarizations used during the preceding characterization step 42. In other words, during the second determination step 46, a search is made for every incidence polarization (−90°, 0, $Z_{L,10}$), (−90°, 180°, $Z_{L,11}$), (−90°, 360°, $Z_{L,12}$) . . . , (90°,180°, $Z_{L,17}$), (90°, 360°, $Z_{L,18}$), for a load impedance $Z_{L,n>9}$ for obtaining the second imposed condition (($|E_{scat,2}|$; $AR_2$). Thus, nine load impedance values $Z_{L,10}$, $Z_{L,11}$, $Z_{L,12}$, $Z_{L,13}$, $Z_{L,14}$, $Z_{L,15}$, $Z_{L,16}$, $Z_{L,17}$, $Z_{L,18}$ are obtained correspondingly associated with each of the nine above-mentioned incidence polarizations and each time satisfying the first imposed condition ($|E_{scat,2}|$; $AR_2$.

According to such non-limiting general example, during the general step 48 of third determination of the incidence polarization (i.e. the pair of angles ($\alpha_i$, $\delta_i$)) from the result of the first and second determination, the results of the two determination steps 44 and 46 are compared so as to choose the incidence polarization and the pair of impedances which satisfy, e.g., but not limited to, $Re\{Z_L^1\}=Re\{Z_L^2\}$ or ($R_L^1=R_L^2$), exponent 1 and 2 being associated with the first and second conditions respectively, imposed during the first and second determinations, which is equivalent to the comparison of the table below:

As an example, but not limited to, such comparison leads to the identification of the polarization (0°, 360°) at which $Z_{L,6}=Z_L^1$ and $Z_{L,5}=Z_L^2$ satisfy the expected equality ($R_{L,6}=R_{L,15}\geq 0$).

According to a particular case of implementation of the method 40 illustrated by FIG. 3, the goal is to determine the variation of the impedance of the sensor 18 to be soldered onto the antenna-sensor 16, making it possible to switch from linear polarization to circular polarization, such impedance of the sensor then corresponding to the load impedance $Z_L$ of the sensor 18 applied to the target antenna 20 of the antenna-sensor 16 as illustrated by part B of FIG. 2, as previously described.

In such particular case, illustrated by FIG. 3, the characterization step 42 is then implemented for a predetermined plurality of linear polarizations of the incident plane wave transmitted by the transmitting antenna 12.

In other words, this first step 42 is equivalent to acquiring the values of the structure and antenna modes of the target antenna 20. To this end, the target antenna 20 is first excited locally, in order to measure the radiated field $E_{ant}^V$ thereof and to calculate the impedance $Z_a$ thereof at the interface between the target antenna 20 and the possible load $Z_L$, as illustrated by part B of FIG. 2, and then loaded by a short circuit and illuminated by an incident wave $E_i$ in order to identify the structure mode $E_{short}^V$ and $E_{short}^H$ thereof.

In addition, during such step, the measurement of the backscattered field in open circuit $E_{open}^V$ is optionally added in order to indirectly calculate the short-circuit current $I_0$, following the relationship given by the following equation (7):

$$I_0 = \left(E_{short}^V - E_{open}^V\right)\frac{I_a}{E_{ant}^V} \tag{7}$$

It should be noted that the characterization step 42 of the backscattering model is single-frequency for given directions of incidence and of backscattering (i.e. a new measurement is necessary in the event of a change in the direction of incidence or in the direction of backscattering).

Subsequently, as an example, but not limited to, the frequency f=868 MHz, the direction of incidence ($\theta_r$, $\phi_r$)= (0,0) and the direction of backscattering ($\theta_s$, $\phi_s$)=(0,0) are considered and applied in particular to the example of target antenna 20 described above in relation to FIG. 2, which is equivalent to considering a monostatic case, and the corresponding values measured during characterization step 42 are given in the table below:

TABLE 2

| Result of the first determination 44 | Result of the second determination 46 |
| --- | --- |
| (−90°, 0°, $Z_{L,1}$) → $|E_{scat,1}|$; $AR_1$ | (−90°, 0°, $Z_{L,10}$) → $|E_{scat,2}|$; $AR_2$ |
| (−90°, 180°, $Z_{L,2}$) → $|E_{scat,1}|$; $AR_1$ | (−90°, 180°, $Z_{L,11}$) → $|E_{scat,2}|$; $AR_2$ |
| (−90°, 360°, $Z_{L,3}$) → $|E_{scat,1}|$; $AR_1$ | (−90°, 360°, $Z_{L,12}$) → $|E_{scat,2}|$; $AR_2$ |
| (0°, 0°, $Z_{L,4}$) → $|E_{scat,1}|$; $AR_1$ | (0°, 0°, $Z_{L,13}$) → $|E_{scat,2}|$; $AR_2$ |
| (0°, 180°, $Z_{L,5}$) → $|E_{scat,1}|$; $AR_1$ | (0°, 180°, $Z_{L,14}$) → $|E_{scat,2}|$; $AR_2$ |
| (0°, 360°, $Z_{L,6}$) → $|E_{scat,1}|$; $AR_1$ | (0°, 360°, $Z_{L,15}$) → $|E_{scat,2}|$; $AR_2$ |
| (90°, 0, $Z_{L,7}$) → $|E_{scat,1}|$; $AR_1$ | (90°, 0°, $Z_{L,16}$) → $|E_{scat,2}|$; $AR_2$ |
| (90°, 180°, $Z_{L,8}$) → $|E_{scat,1}|$; $AR_1$ | (90°, 180°, $Z_{L,17}$) → $|E_{scat,2}|$; $AR_2$ |
| (90°, 360°, $Z_{L,9}$) → $|E_{scat,1}|$; $AR_1$ | (90°, 360°, $Z_{L,18}$) → $|E_{scat,2}|$; $AR_2$ |

TABLE 3

| $Z_a$ (Ω) | $I_0 E_{ant}^V / I_a$ (V/m) | $E_{short}^V$ (V/m) | $E_{short}^H$ (V/m) |
|---|---|---|---|
| 53 − j6.2 | $0.334 e^{j2.92}$ | $0.212 e^{j3.04}$ | $0.197 e^{-j2.10}$ |

Moreover, in such particular case, illustrated by FIG. 3, the first determination step 44 corresponds to the determination, called "D–X($Z_L^{max}$)" in FIG. 3, of the reactance of the load impedance of the antenna-sensor maximizing the value of the backscattered field associated with said backscattering model, which is equivalent to maximizing the RCS and having a linear polarization.

In other words, according to such particular example, the first condition imposed during the first determination step 44 is to maximize the RCS and also to have a linear polarization, and the value $Z_{L,1} = Z_L^{max}$ is such that $Z_{L,1} = Z_L^1 = Z_L^{max} = R + jX^{max}$.

Considering again, as an example, but not limited to, the frequency f=868 MHz, the direction of incidence ($\theta_r$, $\phi_r$)=(0,0) and the direction of backscattering ($\theta_s$, $\phi_s$)=(0,0) applied to the example of the target antenna 20 described above in relation to FIG. 2, the value $Z_L^{max}$ calculated and validated by simulation is $Z_L^{max} = 0 + j21\Omega$, (i.e. purely reactive). Such reactance value serves as a reference for the next step of second determination.

Moreover, according to the particular case wherein the goal is to determine the variation of the load impedance $Z_L$ making it possible to switch from linear polarization to circular polarization, during the second determination step 46, called "D–Re($Z_L$)+Im($Z_L$)" in FIG. 3, the second condition imposed consists of determining the impedance values $Z_L^2$ for obtaining a circular polarization (i.e. an ellipticity rate equal to one).

In other words, according to such particular case, from the aforementioned system of equations (5) and (6), the method according to the present invention can be used for identifying, in such particular case, the value of the impedance so that the ellipticity rate is either equal to one, or a circular polarization. Such circular polarization is conditioned both by an equality of amplitude between the horizontal and vertical components, and also by a phase shift of +90° (or ±π/2 rad), as seen in the following equation (8), where the orientation is associated with the index (+ for Left Hand and − for Right Hand):

$$E_{scat}^V = \pm j E_{scat}^H \leftrightarrow \begin{cases} |E_{scat}^V| = |E_{scat}^H| \\ \phi_V = \phi_H \pm \dfrac{\pi}{2} \text{ rad} \end{cases} \quad (8)$$

By imposing the conditions of equation (7) on equation (6) and taking into consideration the definition of the reflection coefficient from equation (4), it is possible, according to the present invention, to calculate the polarization conversion impedance (i.e. the load impedance $Z_L$ of the sensor 18, as expressed in the following equation (9):

$$Z_L^\pm = Z_a \frac{(\pm j E_{short}^V \sin \alpha_i e^{j\delta_i} - E_{short}^H \cos \alpha_i)}{\pm j \dfrac{I_0}{2I_a} E_{ant}^V \sin \alpha_i e^{j\delta_i} - (\pm j E_{short}^V \sin \alpha_i e^{j\delta_i} - E_{short}^H \cos \alpha_i)} \quad (9)$$

Based on the backscattering model characterized during the step 42, the real (resistance) and imaginary (reactance) values of the impedance at unit ellipticity rate are calculated as a function of the angle $\alpha_i$ of the plane wave with respect to the target antenna 20 (see equation (9) above), again considering, as an example, but not limited to, the frequency f=868 MHz, the direction of incidence ($\theta_r$, $\phi_r$)=(0,0) and the direction of backscattering ($\theta_s$, $\phi_s$)=(0,0) applied to the example of the target antenna 20 described above in relation to FIG. 2 and by imposing an incident wave with linear polarization ($\delta_i = 0$).

Finally, according to the particular case wherein the goal is to determine the variation of the load impedance $Z_L$ making it possible to switch from linear polarization to circular polarization, the third determination step 48, called "D–$\alpha_i$+$R_{max}$ ($Z_L^{max}$)" in FIG. 3, corresponds then to the determination of the incidence polarization corresponding both to a predetermined load and to the reactance of the load impedance of the sensor of the antenna-sensor, maximizing the value of the backscattered field associated with said backscattering model, and obtaining the maximum resistance value of the sensor load impedance associated with circular polarization backscattering, said range of variation of the load impedance of the antenna-sensor corresponding to the range of variation of the resistance of the load impedance of the sensor between the zero value, associated with a maximum ellipticity rate, and said maximum resistance value, associated with a value equal to one on a linear scale (zero in dB) of the ellipticity rate, for a constant reactance value equal to the reactance of the load impedance of the sensor of the antenna-sensor, maximizing the value of the backscattered field associated with said backscattering model.

In other words, the third determination 48 makes it possible to obtain the incidence polarization which makes it possible to have equality for the imaginary part of the impedances resulting from the first determination step 44 and the second determination step 46 such that: $\text{Im}(Z_L^1) = \text{Im}(Z_L^2) = X^{max}$, and to obtain the real part of $Z_L^2$ associated with this equality.

Thus, considering again, as an example, but not limited to, the frequency f=868 MHz, the direction of incidence ($\theta_r$, $\phi_r$)=(0,0) and the direction of backscattering ($\theta_s$, $\phi_s$)=(0,0) applied to the example of the target antenna 20 described above in relation to FIG. 2, the third determination 48 consists of determining at which angle of inclination the reactance ($X_L^{max} = 21\Omega$) calculated in the first determination step 44, coincides with the value where the RCS is maximum and also where the load is passive (R≥0), i.e. $\alpha_i = 74°$ according to the simulations with an associated load impedance $Z_L^2 Z_L^2 = 66 + j21\Omega$.

In other words, at the end of the method according to the invention implemented in such particular case where the goal is to determine the variation of the load impedance $Z_L$ making it possible to switch from linear polarization to circular polarization, again considering, as an example, but not limited to, the frequency f=868 MHz, the direction of incidence ($\theta_r$, $\phi_r$)=(0,0) and the direction of backscattering ($\theta_s$, $\phi_s$)=(0,0) applied to the target antenna example 20 described above in relation to FIG. 2, a load impedance of the sensor 18 is determined, the resistance of which is apt to vary between 0 and 66Ω while keeping a constant reactance of 21Ω. Such impedance dynamic shows as a variation of the ellipticity rate from 14 to 0, in dB.

Such a variation of load impedance makes it possible to precisely control the antenna mode of the target antenna 20.

It should be noted that the method according to the present invention has been validated by electromagnetic simulation for such example wherein the frequency f=868 MHz, the direction of incidence $(\theta_i, \phi_i)=(0,0)$ and the direction of backscattering $(\theta_s, \phi_s)=(0,0)$ are applied to the example of the target antenna 20, as described above in relation to FIG. 2, and that such a simulation then illustrates that the ellipticity rate, in dB, approaches a linear function of the resistance according to one of the optional features of the present invention according to which the measuring device is configured to have, per predetermined frequency band, a bijective relationship between the load impedance of the sensor and the ellipticity rate.

Moreover, such a simulation also makes it possible to verify that, via the method according to the present invention, a bijective amplitude variation of the backscattered field with respect to the load resistance is obtained, and also a maximization is obtained of the modulus of the RCS when the ellipticity rate represents a linear polarization, the control of the value of the modulus of the RCS making it possible to obtain an additional degree of freedom to be optimized according to the intended application.

A person skilled in the art would understand that the invention is not limited to the embodiments described, nor to the particular examples of the description, the abovementioned embodiments and variants being configured to be combined with one another so as to generate new embodiments of the invention.

The present invention thus makes it possible to take into account the antenna mode and the structure mode of the target antenna in order to optimally quantify the polarization of the electromagnetic field of the antenna-sensor from the ellipticity rate of the electromagnetic field backscattered by said antenna-sensor.

In other words, the principle of the present invention is to base the device for measuring at least one physical quantity (i.e. the interrogation system) of the antenna-sensor on the measurement of the ellipticity rate of the backscattered field in a given frequency band, which makes possible a use within a temperature (or other variable) control system in a laboratory or a plant (highly reverberant media), by reading the signal of the antenna-sensors with larger ranges due to the maximization of the amplitude of the backscattered signal at a specific ellipticity rate configured to be obtained according to the present invention, or a use in higher frequency ranges so as to reduce the size of the target antenna, which further reduces the size of the sensors compared to the measuring device, or further a use aimed at monitoring the integrity of the structures (From Structural Health Monitoring) in order to distinguish the state of a physical element by the discretized ellipticity rate, keeping a large range.

The invention claimed is:

1. A measuring device for at least one physical quantity, the measuring device comprising:
   a transceiver unit for electromagnetic waves,
   an antenna-sensor including a sensor integrated into a target antenna having at least one excitation port, the antenna-sensor having a variable impedance with electromagnetic transduction,
   wherein, per predetermined frequency band and independently of an angular deviation between transmission and the reception of the electromagnetic waves, the measuring device is configured to measure an electromagnetic response of the antenna-sensor at least from an ellipticity rate of an electromagnetic field backscattered by said antenna-sensor, the ellipticity rate characterizing the polarization of the electromagnetic field configured to be measured by said transceiver unit, said electromagnetic response being representative, by the electromagnetic transduction, of said at least one physical quantity to be measured.

2. The measuring device according to claim 1, wherein the measuring device is configured to have, per predetermined frequency band, a bijective relationship between the load impedance of the sensor and the ellipticity rate of the electromagnetic field configured to be backscattered by said antenna-sensor.

3. The measuring device according to claim 2, wherein the load impedance is passive.

4. The measuring device according to claim 2, wherein said antenna-sensor is a radio identification antenna associated with an electronic chip configured to control said load impedance.

5. The measuring device according to claim 2, wherein said antenna-sensor is an active antenna-sensor.

6. The measuring device according to claim 5, wherein the functioning of the sensor depends on a constant local energy source.

7. The measuring device according to claim 5, wherein the sensor is configured to integrate a tool for preprocessing and/or amplifying a signal provided by a local power source.

8. The measuring device according to claim 1, wherein said antenna-sensor is further configured to optimize the amplitude and/or phase of the backscattered electromagnetic field by controlling the ellipticity rate of the backscattered electromagnetic field, by using the sensor load impedance of the antenna-sensor.

9. The measuring device according to claim 8, wherein said antenna-sensor is configured to control said ellipticity rate with the load impedance of the sensor, said load impedance of the sensor being configured to directly vary the antenna mode of the antenna-sensor, the value of said load impedance of the sensor being configured to be adjusted by taking into account the structure mode of the antenna-sensor, said structure mode being determined by a characterization of the associated backscattered electromagnetic field.

10. The measuring device according to claim 8, wherein said antenna-sensor includes a sensor integrated into a target antenna having at least two excitation ports, said antenna-sensor being configured to control said ellipticity rate, with the load impedance of the sensor, the load impedance of the sensor being configured to directly vary the orthogonal components of the antenna mode of the antenna-sensor, the value of the load impedance of the sensor being configured to be adjusted by taking into account the structure mode of the antenna-sensor, said structure mode being determined by a characterization of the associated backscattered electromagnetic field.

11. A method for determining the range of variation of the load impedance of the sensor of the antenna-sensor of the measuring device according to claim 1, and for determining the incidence polarization of the transceiver unit during wave transmission, the method comprising the following steps, per predetermined frequency band:
   characterization of the backscattering model of said antenna-sensor for a predetermined direction of incidence and a predetermined direction of scattering and for a predetermined plurality of polarizations of the incident plane wave transmitted by the transceiver unit,
   first determination of the reactance and/or resistance of the load impedance of the sensor of the antenna-sensor associated with a first value of predetermined amplitude and/or ellipticity rate of the backscattered field associated with said backscattering model as a function of the incident plane wave polarization, second determination of the reactance and/or resistance of the load impedance of the sensor associated with a second predetermined amplitude and/or ellipticity rate value of the backscattered field associated with said backscattering model as a function of the incident plane wave polarization, third determination of the incidence polarization from the first determination and from the second determination.

12. The determination method according to claim 11, wherein:

the characterization step is implemented for a predetermined plurality of linear polarizations of incident plane wave transmitted by the transceiver unit;

the first determination step corresponds to the determination of the reactance of the load impedance of the sensor of the antenna-sensor maximizing the value of the backscattered field associated with said backscattering model; and the third determination step corresponds to the determination of the incidence polarization corresponding both to a predetermined load and to the reactance of the load impedance of the sensor of the antenna-sensor maximizing the value of the backscattered field associated with said backscattering model, and obtaining the maximum resistance value of the sensor load impedance associated with a circular polarization backscattering, said range of variation of the load impedance of the antenna-sensor corresponding to a range of variation of the resistance of the load impedance of the sensor between the zero value, associated with a maximum ellipticity rate, and said maximum resistance value, associated with a zero value of the ellipticity rate, for a constant reactance value equal to the reactance of the load impedance of the sensor of the antenna-sensor, maximizing the value of the backscattered field associated with said backscattering model.

13. The determination method according to claim 11, wherein said step of characterization of backscattering model of said antenna-sensor comprises:

the local excitation of the antenna of said antenna-sensor and:

the measurement of the orthogonal components of the radiated field thereof;

depending on the number of excitation port(s) of said target antenna, the calculation of at least one impedance at an interface between said antenna and a load impedance of said antenna, of predetermined value;

the determination of the structure mode of the antenna of said antenna-sensor by loading said antenna by a short circuit and illuminating by a predetermined incident wave.

* * * * *